Oct. 7, 1958  H. H. GATES  2,854,759
GAGE

Filed Sept. 10, 1956  4 Sheets-Sheet 1

Oct. 7, 1958

H. H. GATES 2,854,759

GAGE

Filed Sept. 10, 1956

Oct. 7, 1958　　　　H. H. GATES　　　　2,854,759
GAGE
Filed Sept. 10, 1956　　　　4 Sheets-Sheet 4

United States Patent Office 2,854,759
Patented Oct. 7, 1958

2,854,759
GAGE

Hesslar H. Gates, Charlestown, N. H., assignor, by mesne assignments, to Ex-Cell-O Corporation, Detroit, Mich., a corporation of Michigan Application September 10, 1956, Serial No. 609,028

12 Claims. (Cl. 33—178)

This invention relates to contractible gages in general where the gaging anvils are relatively movable in and out of gaging position and more particularly to a novel three-zone contact gage wherein the anvil movement is substantially equal to the diametric change of test pieces measured thereby. Such contractible gages are of special utility for gaging threaded or grooved workpieces, and are used for assemble ability checking, pitch diameter checking and the like.

Gages using two-zone contact gage anvils are well known to the art, being described for example in U. S. Patent No. 2,427,924 to Rose, and in U. S. Patent No. 2,678,503 to Gates. While such gages may have arcuate gaging surfaces, such surfaces will make full contact with the workpiece being gaged only when the radius of curvature of the workpiece exactly equals that of the gaging surface. When the curvature of the workpiece differs from that of the gaging surfaces, only point contact occurs and hence such gages are properly referred to as having "point" contact, the term "zone" being used herein as inclusive of such point contact and arcuate contact which exists only in the ideal case. In internal gages the anvil curvature is normally made equal to or less than the low limit of tolerance spread or range of work sizes for which the gage is furnished, while in external gages the anvil curvature is normally equal to or greater than the upper limit of such spread or range. Consequently, two-zone contact gages are in fact two-point contact gages for all sizes other than the minimum or maximum respectively. Two-point contact results in instability of the work on the gage and difficulty in locating it at right angles to the plane of gaging contact.

To overcome this inherent weakness of two-point contact gages, three-point contact gages have been used to achieve stability, such a gage being described, for example, in U. S. Patent No. 2,363,077 to Moore. As therein described, one of the anvils has two spaced contact members for engagement with angularly spaced points of a test piece and the other has a single such surface movable on the perpendicular bisector of the chord between the contact members of the other anvil. This anvil structure shown in the Moore patent, wherein the single contact anvil is movable between the two contact members of the other, has manufacturing and other disadvantages compared to the anvils described in Patent 2,678,503 aforesaid. While the arrangement shown in the Moore patent positively locates the gage in the test piece, it does not have an anvil movement which is equal to the difference between the diameters of test pieces because of its inherent geometry, as hereinafter explained. This characteristic, which the Moore gage shares with other three-point gages, is in the following denoted by the term "error" to be taken in a limited sense for the purpose of distinguishing between such gages and gages using the principles of the present invention. This error makes it much more difficult to set up, check and adjust such a gage by direct means, that is, by micrometer alone or in combination with three-wire measurement or the like, and cumbersome and expensive means in the form of one or more master rings or master plugs must be resorted to. Hence, such a gage loses versatility, and frequently requires non-standard indicator means.

One object of the present invention is to provide a novel gage wherein the anvils have the structural advantages of those shown in Patent 2,678,503 aforesaid, but are modified to provide also the stability advantage of three-point support.

Another object of the invention is to provide a novel three-point contact gage wherein the anvil movement is substantially equal to the diametric change of test pieces gaged thereby. Thus, in my novel gage, advantage may be taken of the stabilizing characteristic of the three-point contact structure, and yet such three points may be so disposed that the relative movement between the anvils reflects a direct and true measurement of the diameters of test pieces of different curvatures.

It is a feature of my invention that the structure provided is readily adapted for use with conventional gage structures with their advantages of quick set up and adjustment, and is also readily adapted to economical manufacture.

Further objects and features will more fully appear from the following detailed description of preferred embodiments of my invention taken in connection with the accompanying drawings in which.

Figure 1:
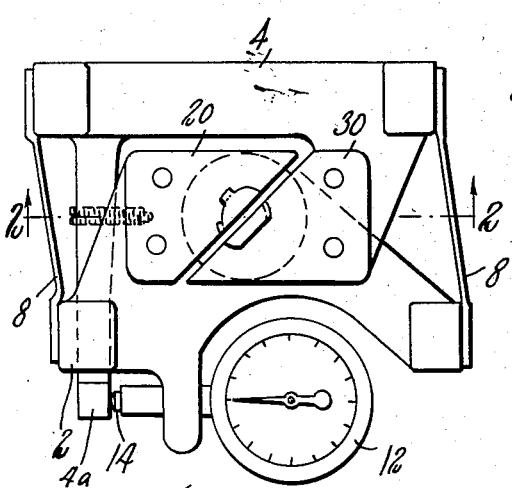
Fig. 1 is a plan view of a basic gage structure embodying the invention.
Figure 2:
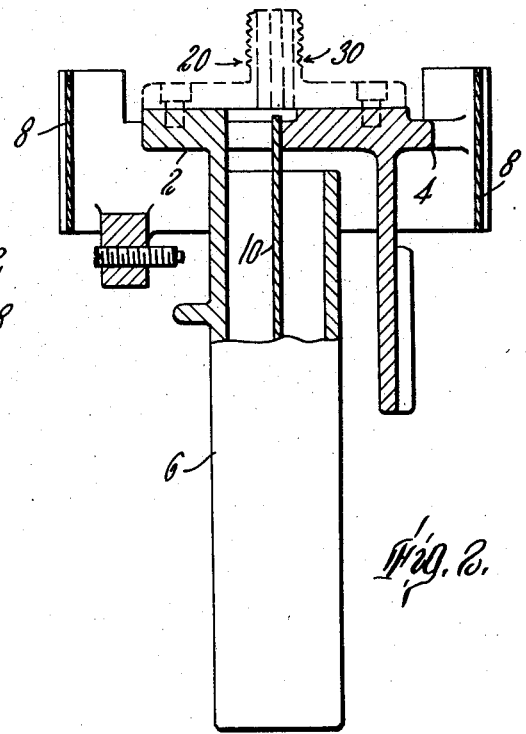
Fig. 2 is a side cross section of the structure of Fig. 1 taken on the line 2—2 thereof.

Referring to Figs. 1 and 2, the three-point gage of the present invention is intended for use with any suitable basic gage anvil support structure having linear movement, particularly for internal or external gages of the contractible type, such as fully shown and described in aforesaid Patent 2,678,503. To briefly describe the structure and operation of such a gage anvil support structure, there are provided two anvil supporting members 2 and 4, member 2 being an integral part of handle 6, and member 4 being mounted on member 2 by means of a pair of spaced, parallel reeds 8 to allow for the desired linear movement of the supporting elements. A leaf spring 10 tends to hold the supporting members separated and a test piece positioned about suitable internal gage anvils on the supporting members will introduce a predetermined pressure load between said test piece and gage anvils. A dial indicator 12 mounted on supporting member 2 has an actuating stem 14 which may be engaged by an arm 4a of member 4 to indicate relative movement of the supporting members and so measure the diameter of a test piece.

Figure 3:
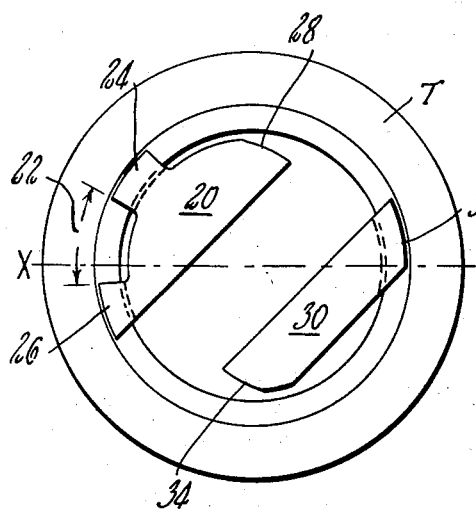
Fig. 3 is an enlarged plan view showing portions of internal gage elements according to the present invention in operative engagement with a test piece.
Figure 4:
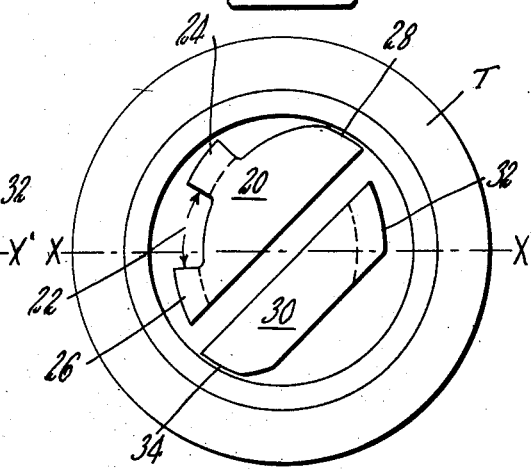
Fig. 4 is a view similar to that of Fig. 3 with the gage elements in contracted position relative to the test piece.

The structure of the three-point gage anvils of the present invention as applied to an internal thread gage is shown in Figs. 3 and 4 in relationship to a surrounding test piece T. Thus, two arcuate gage anvils of equal radii are provided, each mounted on one of the suppporting members 2 and 4. In the anvil structure shown in said Patent 2,678,503 each anvil has a single arcuate gaging surface. In accordance with one feature of the present invention, one of said anvils, generally designated 20, has an angular cut-away portion 22 providing two test piece engaging arcuate portions 24 and 26 on each side thereof and the other of said anvils generally designated 30 has a single test piece engaging arcuate portion 32. Said elements are relatively movable in a direction parallel to line X—X' from the gaging position of Fig. 3 to the contracted position of Fig. 4.

Preferably, too, the element 20 has a smooth peripheral portion 28 and element 30 has likewise such a smooth peripheral portion 34, which portions act as guides when the gage is contracted as in Fig. 4 to prevent interference while presenting or removing the test piece in axial direction from the gage between the threaded gage elements and the interior threads of the test piece.

I have found that within limits of angular extent, which as a practical matter may be set between 15° and 45°, the cut-away 22 imparts to the gage the stabilizing effect of three-point support as in the Moore gage provided the X—X' line extends through the cut away area.

Figure 5:
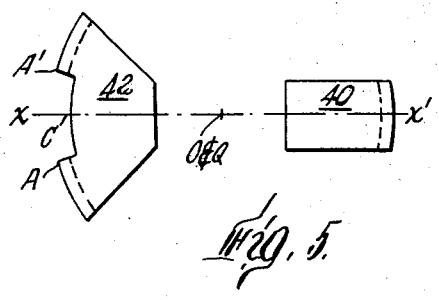
Figs. 5 and 6 are, respectively, a schematic and a diagrammatic showing of the heretofore known three-zone contact gage structure.

In Fig. 5 there is illustrated the operation of anvils arranged for relative movement as in heretofore known three-point gages such as that of Moore, U. S. Patent No. 2,363,077, that is, with the X—X' line coinciding with the perpendicular bisector of the chord across the cut-away. It will be seen that such structure has a first gage anvil 40 with the single gaging portion and a second gaging anvil 42 with two spaced gaging portions equidistantly straddling a line C running through the center O—Q of the curvature of the elements, said line also coinciding with a line X—X' parallel to the direction of relative movement of the anvils. Turning to the diagram of Fig. 6, wherein it is assumed that the gage anvils have been moved outwardly to contact a test piece of larger curvature than that of said elements, it will be found that the center Q of element 40 and center O of anvil 42 remain on line X—X', and will, because of the equidistance of the spacing between the two gaging portions of 42, constrain the center P of the test piece T to also be located on line X—X'. The curvature of the test piece being larger than the curvatures of the anvils, it is then clear that the gaging engagement of anvil 40 will be concentrated in a single point B coinciding with intersection X' of line X—X' with T, and engagement of anvil 42 will be concentrated at two points A and A' at the edges of the cut-away portion between the gaging portions. The distance O to Q, or separation of the anvils, is greater than the change in diameter between a smaller and larger test piece due to differences in height of arc subtended by the chord between A and A' in the two cases. This difference is the error of prior three-point gages as previously referred to. It can be compensated to some extent by various arrangements of the moving and indicating mechanisms but such solutions are not fully satisfactory. The present invention provides a simple and effective solution to this problem in a novel arrangement of three-point anvils in reference to their direction of movement as will now be explained.

Figure 7:
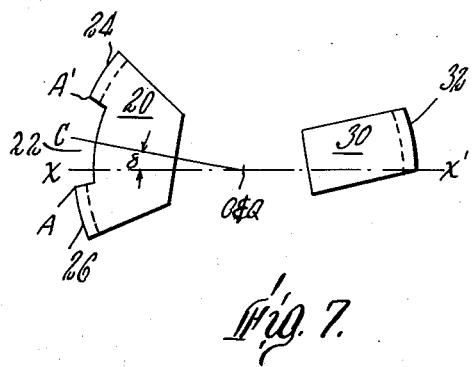
Figs. 7 and 8 are similar showings of the arrangement of the gage of the present invention.
Figure 8:
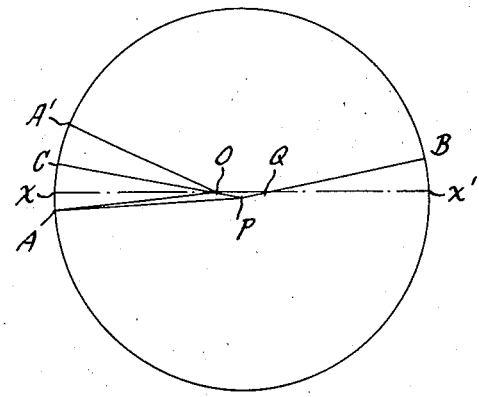

I have found that the error inherent in the above described three-point gage structure may be substantially eliminated while retaining the advantage of stability inherent in the three-point form by disposing the gaging points in such a manner that the direction of movement of the anvils is substantially parallel to a straight line passing through the centers of curvature of their gaging surfaces and between but closer to one than the other of the points A and A' at each edge of the cut-away portion 22. Thus, in Fig. 7 the gaging portions 24 and 26 of anvil 20 are so arranged that the points A and A' straddle the line X—X' and the angle δ between said line X—X' and the median line C, the perpendicular bisector of the angle of the open portion and of the chord AA', is less than half the angle between the points A and A'. As shown in the diagram of Fig. 8, point B, the contact point of anvil 30 disposed on the opposite side of a perpendicular to line X—X' generally centrally thereof, will thus assume a position above line X—X' as well as said perpendicular bisector, and the center P of any test piece with a curvature larger than the curvature of the anvils will be disposed below line X—X' on said line C where it intersects the extension of radius B—Q of anvil 30. The gaging points may thus be considered to lie in three separate imaginary quadrants defined by line X—X' and its central perpendicular.

Figure 6:
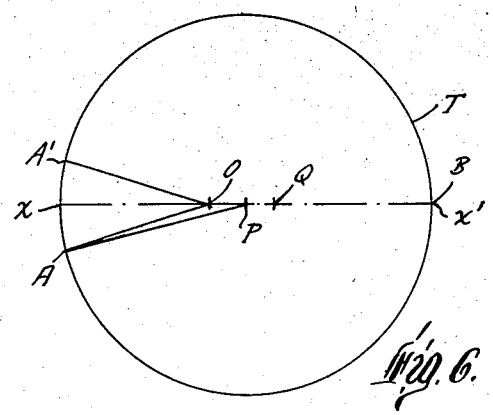

Comparing Fig. 8 with Fig. 6, from geometrical consideration, it can be determined that the distance O—Q in Fig. 8 is less than in Fig. 6 where movement in excess of diameter change took place, although the minute, though important, differences cannot precisely be illustrated in the diagrammatic showings of said figures. Thus, in Fig. 8 the line X—X' is a chord which is shorter than the X—X' diameter line of Fig. 6, the distance O-X in Fig. 8 is greater than in Fig. 6, and the distance Q-X' in Fig. 8 is greater than in Fig. 6. Since in both cases O—Q is X—X' minus O—X minus Q—X', O—Q is necessarily less in Fig. 8 than in Fig. 6.

If the X—X' line were to pass through either of the points A or A', the distance of movement of anvil center O—Q would be too greatly reduced, over-correcting the plus error in Fig. 6 to a minus one. In such case, it will be appreciated that O—X will equal the radius A—O of the smaller workpiece whereas in Figs. 6 and 8 it is less than such radius. Q—X' will also be greater than such radius and X—X' is shorter than the diameter of T-max. The distance O—Q being X—X' minus O—X minus Q—X', must therefore be less than the difference in diameters D and d of the two workpieces, being a distance less than D minus a distance greater than d.

Figure 9:
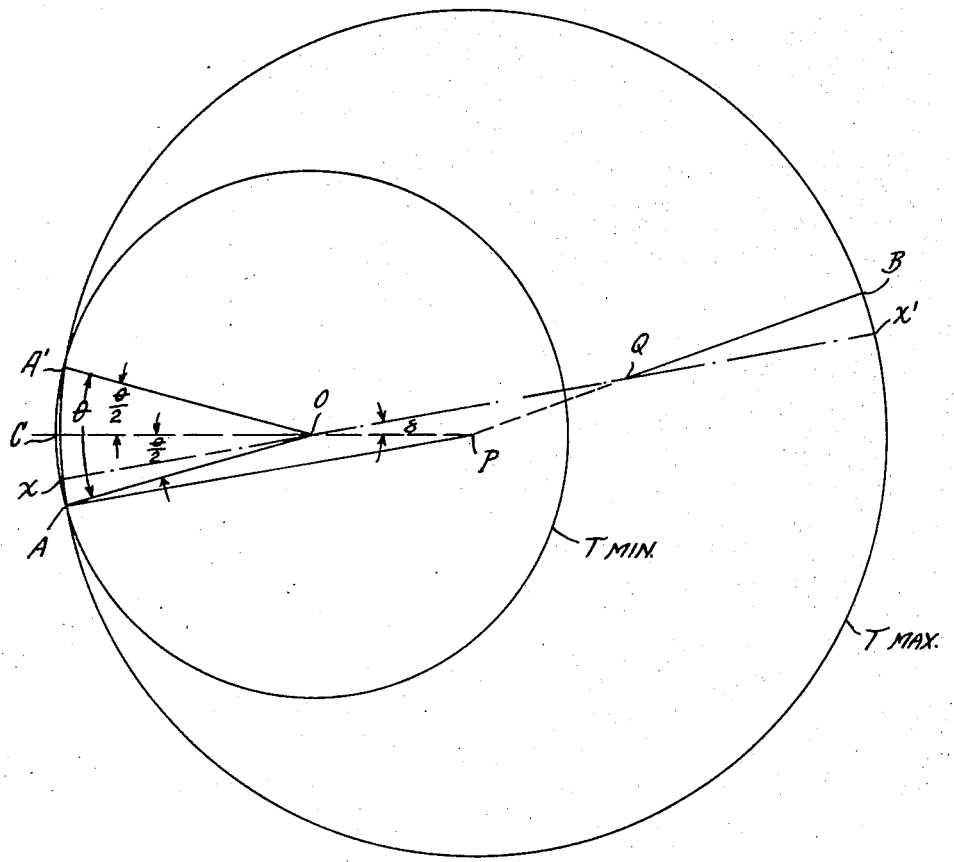
Fig. 9 is a diagrammatic showing of the geometry of the present invention as applied to the internal gage of Figs. 7 and 8.

Fig. 9 shows diagrammatically and in greater detail the organization of the coordinates in a geometrical system that will provide a structure according to a preferred embodiment of this invention, and wherein the angle δ between the median line C and the line X—X' parallel to the direction of movement of the gage elements may be determined.

As a first step, the desired width of the cut-away portion 22 of the two-point contact element 20 is established on the basis of stability as well as by other design parameters. As above stated, I have found that such width, expressed in terms of an angle θ of the arc of the gage element 20 can vary from 15° to 45° and may preferably be about 30°. With the angle θ known, the angle δ can be determined since side OP of triangle OPQ can be calculated and from that side and the two other known sides of triangle OPQ, δ can be calculated. In more detail, by moving the elements relatively to each other in a direction parallel to line X—X' a distance from O to Q, the anvils will contact test piece T-max. Center P of the larger test piece T-max. will be located on median line C as is center O of the minimum test piece T-min. and line C will form angle $$\frac{\theta}{2}$$

A to O. With the known elements in triangle AOP: A—O equal to the radii of anvil curvature (which is assumed to be T-min.), A—P equal to the radius of T-max., and the angle AOP which is $$180° - \frac{\theta}{2}$$

the distance O—P can be calculated to give the only unkown side of triangle OQP, since O—Q by hypothesis equals the difference between diameters T-min. and T-max.; and Q—P equals the difference between radii of T-min. and T-max. Knowing these elements, angle δ can be calculated. If, for example, angle θ is chosen to be 30° and a test piece T-min. to have 1" diameter (d) with a tolerance allowance of plus .010", to give T-max. of 1.010" diameter (D), such solution will establish the angle δ to a value which, when rounded off to 10°–30", is close enough for correct measuring inside required precision tolerance limits. With zero error at T-max. and T-min., the opposite ends of a tolerance range, the gage cannot err in determining whether or not a given part is within tolerance of the specific diameter for which the gage is set. On the other hand, if the anvils were set as in Figs. 5 and 6, they would erroneously record as outside tolerance, workpieces actually within tolerance and conversely if the X—X' line were to pass through, instead of between points A or A', by virtue of a plus error in the first case and a minus error in the second.

Moreover, with a normal difference between T-min. and T-max., the angle δ determined for T-max. is correct to practically eliminate errors of non-linearity at all intermediate diameters, so that the gage will register without significant deviations the actual diameters of all workpieces between T-min. and T-max.

Figure 10:
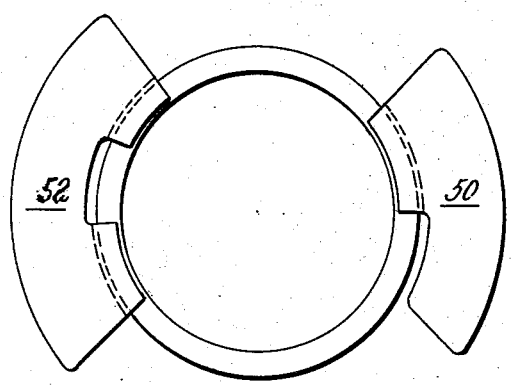
Fig. 10 is an enlarged plan view showing external gage elements according to the present invention in operative engagement with a test piece.
Figure 11:
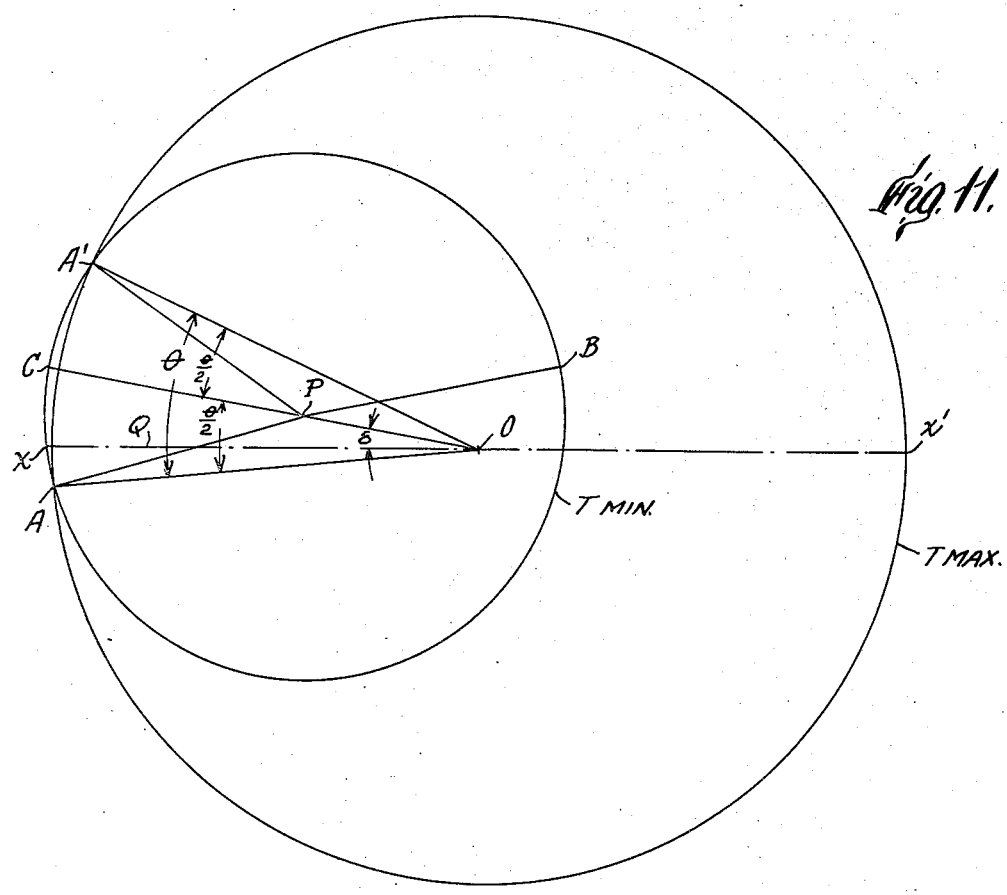
Fig. 11 is a diagrammatic showing of the geometry of the elements as applied to the external gage of Fig. 10.

Fig. 10 and 11 illustrate the application of the invention to external gages which are similar to that above described except that the curvature of the external gage anvils 52 and 50 must be equal to or larger than the maximum test piece. However, a solution similar to that set forth above can be used to determine the angle δ.

It will be understood that while I prefer to use the anvil structure shown in the drawings, the principles by which I am enabled to eliminate error, i. e. the need for aforesaid compensating features, are applicable generally to three-point gages of other construction, such as that of the Moore patent.

From the foregoing description of this invention, it is evident to those skilled in the art that various changes and modifications may be made therein without departing from its spirit or scope as set forth in the appended claims.

I claim:

1. A gage comprising a pair of gage anvils mounted for relative linear movement toward and away from one another, one of said anvils providing a pair of angularly spaced gaging surfaces for engagement with two spaced zones on the periphery of a test piece to be measured and the other of said elements providing an arcuate gaging surface for engagement with a single zone on the generally opposite periphery of said test piece, the direction of movement of said anvils being substantially parallel to a straight line passing through the center of curvature of said arcuate surface and between but closer to one than to the other of said pair of spaced engaging surfaces, whereby the differences in the relative movements of said anvils in gaging test pieces of different diameters will substantially equal the difference in said diameters.

2. A gage as claimed in claim 1 wherein said anvils each have arcuate gaging surfaces of equal radii.

3. A gage as claimed in claim 1 wherein the angular spacing of said spaced gaging portions is between about 15 and 45 degrees.

4. A contractible, internal gage having a first and a second gaging anvil each having circularly curved gaging portions arranged for relative movement along a line which is a diameter of a circular curvature of gaging portions of said anvils, said portions disposed on opposite sides of a perpendicular to said diameter through the center of said curvature said diameter and said perpendicular forming imaginary quadrants; a single gaging portion of the first anvil to engage a test piece substantially only in the first quadrant, the second anvil having two angularly spaced gaging portions, one of said portions to engage said test piece in the second quadrant, and the other portion to engage said test piece in the third quadrant.

5. A contractible, internal gage according to claim 4 wherein the angular spacing between the gaging portions of said second anvil is between about 15 and 45 degrees.

6. A contractible, internal gage according to claim 4 wherein the centers of curvatures of said gaging portions move along a line extending between the two gaging portions of the second anvil and closer to one such portion than the other.

7. A contractible, internal gage according to claim 6 wherein said gaging anvils have formed thereon smooth portions remotely located from said gaging portions, said smooth portions, in the fully contracted gage condition, disposed in closer proximity to the minimum bore of said test piece than are said gaging portions.

8. A contractible internal gage according to claim 7 wherein said gaging anvils have threads formed on their gaging portions.

9. A contractible, external gage having a first and a second gaging anvil each having circularly curved gaging portions arranged for relative movement along a line which is a diameter of a circular curvature of gaging portions of said anvils, said portions disposed at opposite sides of a perpendicular to said diameter through the center of said curvature said diameter and said perpendicular forming imaginary quadrants; a single gaging portion on the first anvil to engage a test piece substantially only in the first quadrant, the second anvil having two angularly spaced gaging portions, one of said portions to engage said test piece in the second quadrant, and the other portion to engage said test piece in the third quadrant.

10. A contractible, external gage according to claim 9 wherein the angular spacing between the gaging portions of said second anvil is between about 15 and 45 degrees.

11. A contractible, external gage according to claim 9 wherein the centers of curvature of said gaging portions move along a line extending between the two gaging portions of the second anvil and closer to one such portion than the other.

12. A contractible, internal thread gage of the class described having two movable members, the first member supporting an anvil provided with a single gaging portion, and the second member supporting an anvil provided with two angularly-spaced gaging portions, the direction of movement of said members being at an angle to the median line of said angular spacing which is less than half of said angular spacing, said members operable to place said gaging portions in engaging position with a test piece, and alternately to place said gaging portions in non-engaging position with the extremes of the gaging points inside the smallest bore of such test piece, said anvils having smooth, peripheral portions so spaced from said gaging portions as to lie in closer proximity to said bore than said gaging portions when in said non-engaging position.

References Cited in the file of this patent

UNITED STATES PATENTS

| | | |
|---|---|---|
| 2,363,077 | Moore | Nov. 21, 1944 |
| 2,427,924 | Rose | Sept. 23, 1947 |
| 2,678,503 | Gates | May 18, 1954 |
| 2,762,131 | Gates | Sept. 11, 1956 |